Patented Aug. 6, 1929.

1,723,384

UNITED STATES PATENT OFFICE.

WALTER O. SNELLING, OF ALLENTOWN, PENNSYLVANIA.

METHOD OF PRESERVING WOOD.

No Drawing.   Application filed November 17, 1926. Serial No. 149,002.

My invention relates to improvements in methods of preserving wood, and more particularly relates to an improved method of treating wood to increase its resistance to water and its resistance to insect pests and fungus growths. One of the objects of my invention is to provide a method for the treatment of railroad ties, fence posts, and like objects of wood for the purpose of materially lengthening their effective life in ordinary use by increasing their resistance to both animal and vegetable parasites, and by rendering the objects treated somewhat repellant to water and relatively resistant to its normal deteriorating effect.

I have discovered that when a petroleum product such as a heavy crude oil, shale oil, a heavy still residue or other petroleum product of relatively high specific gravity and relatively low content of volatile material is digested or thermolyzed at an elevated temperature under maintained high pressure, deep-seated chemical changes are produced, with the formation within the petroleum product of unsaturated bodies which for many hours after the thermolyzing treatment possess the ability to undergo chemical recombinations with the formation of highly viscous and even solid polymerization products. I have further discovered that when wood or other porous material is saturated with a thermolyzed heavy petroleum product within a short time after the petroleum product has been subjected to the simultaneous effects of high temperature and high pressure, the reactions which I have described will go on within the substance or within the pore spaces of the wood, thus forming within the substance of the material being treated viscous and solid reaction products which are strongly repellent or inhibitory to both animal and vegetable life, and which are also water-repellent and accordingly are of a water-proofing nature.

As one example of the application of my present invention, I may place a heavy petroleum product such as Mexican crude oil in a suitable closed vessel or digestor, the volume of the crude oil preferably occupying more than half but not more than seven-eighths of the total volume of the digesting vessel so as to allow proper space for the volatile products formed by the heating of the oil. I now heat the contents of the digesting vessel to a thermolyzing temperature, and prefer to employ a temperature in excess of 400° C. In the preferred embodiment of my invention I employ the pressure indicated by a pressure gage attached to my thermolyzing vessel as my guide to the amount of heating to be employed, and using this method of control I heat the contents of my digesting vessel until a gage pressure in excess of 400 pounds per square inch is indicated.

Using heavy Mexican crude oil as my raw material I find that a suitable degree of chemical change is produced by digesting until a momentary thermally produced pressure of 800 pounds per square inch is indicated by the pressure gage attached to the digesting vessel although a lower pressure with a corresponding longer period of thermolysis may be employed successfully. Having thermolyzed my petroleum product as described by the simultaneous action of a high temperature and a high pressure, and filtered if necessary to remove any insoluble products that may be present, I use the resulting liquid material to impregnate any suitable porous material by methods well known in the art. I may, for example employ reduced pressure to first withdraw from the porous material to be impregnated as much of the air as possible, or I may first heat the material to be impregnated for the purpose of partially removing from it a portion of its contained water and other volatile material. I may employ pressure to force my thermolyzed oil within the pores of the porous material to be treated, and this pressure may be either the thermally produced pressure resulting from the thermolyzing treatment, or it may be independently produced pressure resulting from the action of a pressure pump of any suitable type.

The essential feature of my invention is the preserving of wood or other porous material by the very viscous and even solid polymerization products which result from the chemical combination of very fluid products present in my thermolyzed oil as the result of the subjecting of the initial petroleum product to the combined effects of the high temperature and high pressure described.

I have found that wood or other porous material treated in accordance with my present invention possesses exceptional value for use in moist climates or under conditions of exposure to the elements. I am aware that wood has long been treated with coal tar, creosote and like chemical bodies, for the purpose of increasing its resistance to deteriorating conditions, and I am also aware that many petroleum products have been similarly used in the preservation of wood. My present invention is distinguished from all such prior uses of petroleum products as preserving agents through the fact that the chemical bodies to which the efficiency of my present process is due are applied to the wood as highly chemically reactive fluids of very low viscosity, these chemical bodies spontaneously undergoing chemical reaction within the substance of the porous material being treated within a period of time of not over forty-eight hours after the thermolyzing treatment of the original raw material to form very viscous and solid reaction products of very insoluble character and chemically inert nature, and resembling heavy asphalt and coke in appearance.

I have found that the efficiency of my present process is in large part due to the fact that the chemical bodies which I use as my preserving materials are present in the treated wood as insoluble substances of either solid or extremely viscous nature. It will of course be evident that when a preservative material of fluid nature is used to impregnate wood or other porous material, the impregnating agent can come out of the wood quite as readily as it goes in. Much ingenuity has been devoted to the development of methods for the impregnation of wood and other like materials with fluid preservative compounds, for the purpose of preventing such compounds being removed from the wood by capillarity and by like effects. The substances to which my present process of preserving porous materials owes its efficiency go into the wood as thin fluids of low viscosity, and by virtue of their chemical nature spontaneously change in the course of a few hours into bodies of such high viscosity that there is no tendency for them to exude from the treated material, or to be withdrawn from it by capillarity through contact with untreated wood, earth or other porous material.

I do not know the chemical nature of the highly reactive products to which the efficiency of my present process is due, and although I have devoted considerable study to the chemical composition of these bodies, their very short life before recombination and resinification of solidification has prevented the determination of their chemical nature. They are apparently highly unsaturated products which recombine with great rapidity to form very viscous asphalt-like bodies and solid coke-like bodies of relatively high carbon content and relatively low hydrogen content. The final products of polymerization are relatively chemically inert although the initial bodies are extremely reactive.

In the application of my present invention I may employ a wide variety of petroleum bodies as my raw materials, but I prefer to use heavy crude oils or heavy still residues or other petroleum products of relatively high specific gravity and relatively low viscosity and relatively low volatile content. I may of course employ ordinary crude petroleum of normal gasoline content as my raw material, after first distilling from such petroleum the more volatile constituents, and in general I may employ any suitable petroliferous raw material originally containing only a small content of volatile constituents or treated to reduce originally present volatile constituents to a low percentage. Although I prefer to employ a temperature of about 450° C. and a thermally produced or autogenous pressure of 800 pounds per square inch and a time of thermolysis of five minutes. I may use thermolyzing temperatures from as low as 400° C. to as high as 600° C. or somewhat higher, and pressures from as low as 300 pounds per square inch to as high as 3,000 pounds per square inch or higher, and a period of thermolysis varying from slightly less than one minute to a thermolyzing period of one-half hour or even longer.

My present application is a continuation in part of my pending application S. N. 595,167 which in turn is a renewal of my forfeited application S. N. 26,110 which in turn was a continuation in part of my earlier application S. N. 800,323. My present application relates specifically to the preparation of highly reactive products useful in the preservation of wood, and to the application of such products in the treatment of wood for the purpose of increasing its life under unfavorable conditions of exposure, and particularly its resistance to dry rot and other fungus growths, and to penetration by the many forms of animal life which normally attack untreated wood.

As the highly reactive products of thermolysis which form by recombination or polymerization the highly viscous and solid bodies to which my present invention owes its efficiency form only a portion of the thermolyized oil produced by subjecting petroliferous material to the combined effects of temperatures in excess of 400° C. and thermally produced pressure in excess of 400 pounds per square inch, it will be evident that the excess fluid material may be removed after impregnation of wood in accordance with my present invention, without reducing the preserving effect. After allowing a suitable period to elapse after impregnating wood with the complete products of the thermolysis of petroliferous material, I may, for example, remove the excess of unpolymerized fluid oil by centrifugal action, or by the action of any suitable solvent in which the fluid oil is freely soluble but which will not dissolve the asphaltic and coke-like polymerization products. I have found for example that if wood impregnated in accordance with my present invention is permitted to stand for a period of forty-eight hours to permit the polymerizing action to complete itself, and is then extracted with such a readily volatile solvent as liquid butane, the butane will extract all of the non-polymerized products present in the wood, while leaving a large percentage of the polymerized preserving material. The excess of butane can be removed by the use of steam, or by heating the treated wood under reduced pressure, and can thus be recovered. In practice, however I find that the recovery of the excess of non-polymerizable oily products is usually too expensive to make such recovery commercially possible, except when recovery is effected by ordinary draining of the impregnated wood, or "whizzing" in a centrifugal such as is commonly used for the purpose of removing excess liquid substances from solid materials.

Although I have specifically described a discontinuous or "batch" method for the thermolyzing of petroleum products under conditions of high temperature and pressure, it will of course be evident that I may obtain chemically reactive polymerizable bodies by the continuous treatment of a stream of heavy hydrocarbons, and that I may employ the thermolyzed products obtained by such continuous treatment in the preservation of wood in the manner herein described.

It will be evident that many modifications may be made without departing from the essential principles of my invention as herein described, and accordingly no limitation should be imposed upon my invention except such as are indicated in the appended claims.

I claim:

1. The process of treating porous materials which comprises impregnating such porous materials with the product of the thermolysis of petroliferous materials at a temperature in excess of 400° C.

2. The process of treating porous materials which comprises impregnating such porous materials with the product of the thermolysis of petroliferous materials at a temperature in excess of 400° C. and a thermally produced pressure in excess of 400 pounds per square inch.

3. The process of impregnating materials which comprises forming within the pores of such materials a viscous reaction product of liquid thermolyzed polymerizable petroleum materials.

4. The process of impregnating materials which comprises forming within the pores of such materials a solid reaction product of liquid thermolyzed polymerizable petroleum materials.

5. The process of treating wood which comprises forming within the pores of the wood a reaction product of liquid polymerizable petroleum materials.

6. As a new composition of matter, a porous material containing within its pores a solid polymerzied product of thermolyzed petroleum material.

7. As a new composition of matter, wood containing within its pores a solid polymerized product of thermolyzed petroleum material.

In testimony whereof, I have hereunto subscribed my name this 15th day of November, 1926.

WALTER O. SNELLING.